United States Patent
Niessner et al.

(10) Patent No.: US 12,071,571 B2
(45) Date of Patent: Aug. 27, 2024

(54) SEALABLE MULTILAYER FILM OF STYRENE POLYMERS WITH IMPROVED ORGANOLEPTIC PROPERTIES

(71) Applicant: INEOS STYROLUTION GROUP GMBH, Frankfurt am Main (DE)

(72) Inventors: Norbert Niessner, Friedelsheim (DE); Yvonne Van Veen, Uithoorn (NL)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 0 days.

(21) Appl. No.: 18/042,874

(22) PCT Filed: Aug. 30, 2021

(86) PCT No.: PCT/EP2021/073875
§ 371 (c)(1),
(2) Date: Feb. 24, 2023

(87) PCT Pub. No.: WO2022/043548
PCT Pub. Date: Mar. 3, 2022

(65) Prior Publication Data
US 2023/0392052 A1    Dec. 7, 2023

(30) Foreign Application Priority Data

Aug. 31, 2020  (EP) .................................... 20193641

(51) Int. Cl.
*B65B 7/28*   (2006.01)
*B29C 48/00*  (2019.01)
(Continued)

(52) U.S. Cl.
CPC ............. *C09J 7/35* (2018.01); *B29C 48/0021* (2019.02); *B29C 48/022* (2019.02); *B29C 48/08* (2019.02);
(Continued)

(58) Field of Classification Search
CPC ...... B32B 27/08; B32B 27/32; B32B 2307/31
(Continued)

(56) References Cited

U.S. PATENT DOCUMENTS

| 3,658,946 A | 4/1972 | Bronstert et al. |
| 5,393,592 A | 2/1995 | Jenne |

(Continued)

FOREIGN PATENT DOCUMENTS

| BE | 1010747 A3 | 1/1999 |
| DE | 1770392 A1 | 3/1972 |

(Continued)

OTHER PUBLICATIONS

Wittenberg et al., (2018) Hydrogen bonding and thermoplastic elastomers—a nice couple with temperature adjustable mechanical properties. Soft Matter, issue 14, No. 14, p. 2701-2711.

*Primary Examiner* — Jacob A Smith
(74) *Attorney, Agent, or Firm* — RAPHAEL BELLUM PLLC (57) ABSTRACT

A heat-sealable multilayer film comprising: a) 1% to 50% by weight of heat-sealable polymer layer (A), b) 1% to 99% by weight of polymer layer (C), and c) 0% to 95% by weight of polymer layer (B), with polymer layer (A) comprising: A1) 20% to 90% by weight of impact-resistant polystyrene and A2) 5% to 50% by weight of vinylaromatic-diene block copolymer; and polymer layer (B) comprising impact-resistant polystyrene, vinylaromatic-diene block copolymer, and/or mixtures of styrene homopolymers or vinylaromatic-diene graft copolymers with vinylaromatic-diene block copolymers; and polymer layer (C) having a melting temperature of ≥170° C.; and polymer layer (A) comprising) i) 66% to 99% by volume of a vinylaromatic hard phase and ii) 1% to 34% by volume of a diene soft phase surrounded by the hard phase and taking the form of spheres/cylinders.

20 Claims, 1 Drawing Sheet (51) Int. Cl.
| | |
|---|---|
| *B29C 48/08* | (2019.01) |
| *B29C 48/21* | (2019.01) |
| *B32B 7/12* | (2006.01) |
| *B32B 27/08* | (2006.01) |
| *B32B 27/18* | (2006.01) |
| *B32B 27/30* | (2006.01) |
| *B32B 27/34* | (2006.01) |
| *B32B 27/36* | (2006.01) |
| *B65D 65/40* | (2006.01) |
| *C09J 7/29* | (2018.01) |
| *C09J 7/35* | (2018.01) |
| *B29K 25/00* | (2006.01) |
| *B29K 67/00* | (2006.01) |
| *B29K 77/00* | (2006.01) |
| *B29L 31/00* | (2006.01) |

(52) U.S. Cl.
CPC ............... *B29C 48/21* (2019.02); *B32B 7/12* (2013.01); *B32B 27/08* (2013.01); *B32B 27/18* (2013.01); *B32B 27/302* (2013.01); *B32B 27/34* (2013.01); *B32B 27/36* (2013.01); *B65B 7/2878* (2013.01); *B65D 65/40* (2013.01); *C09J 7/29* (2018.01); *B29K 2025/06* (2013.01); *B29K 2067/00* (2013.01); *B29K 2077/00* (2013.01); *B29L 2031/712* (2013.01); *B32B 2250/24* (2013.01); *B32B 2270/00* (2013.01); *B32B 2274/00* (2013.01); *B32B 2307/31* (2013.01); *B32B 2307/558* (2013.01); *B32B 2307/746* (2013.01); *B32B 2435/02* (2013.01); *C09J 2301/162* (2020.08); *C09J 2301/304* (2020.08); *C09J 2301/414* (2020.08); *C09J 2453/006* (2013.01); *C09J 2477/006* (2013.01)

(58) Field of Classification Search
USPC .......................................................... 53/478
See application file for complete search history.

(56) References Cited

U.S. PATENT DOCUMENTS

| | | |
|---|---|---|
| 5,809,750 A | 9/1998 | Klepsch |
| 6,031,053 A | 2/2000 | Knoll et al. |
| 6,537,632 B1 | 3/2003 | Klepsch |
| 2012/0328685 A1* | 12/2012 | Stutz ................... B65D 88/542 |
| | | 426/326 |
| 2013/0118128 A1* | 5/2013 | Luecke ................... B65B 3/16 |
| | | 428/419 |

FOREIGN PATENT DOCUMENTS

| | | | |
|---|---|---|---|
| DE | 3248746 A1 | 7/1984 | |
| DE | 3531036 A1 | 3/1987 | |
| EP | 0406681 A2 * | 6/1990 | ............ B32B 27/08 |
| EP | 0406681 A2 | 1/1991 | |
| EP | 0437745 A2 | 7/1991 | |
| WO | WO-9317068 A1 * | 9/1993 | ......... B65D 77/2032 |
| WO | 9535335 A1 | 12/1995 | |
| WO | 9317068 A1 | 9/1996 | |

* cited by examiner

SEALABLE MULTILAYER FILM OF STYRENE POLYMERS WITH IMPROVED ORGANOLEPTIC PROPERTIES

The invention relates to a heat-sealable multilayer film containing a sealable layer based on styrene polymer(s), and to a process for production thereof and to the use thereof for vessels made from styrene polymer(s).

Plastic vessels for packaging of foods must be sealed airtight in many cases in order to ensure the shelf life thereof. Closures used in many cases, especially in the packaging of dairy products, are aluminum foils, to which a sealing lacquer is applied, which ensures sufficient adhesion to the various types of plastic vessel. Apart from aluminum foils, polymer films are also used, which are provided with a sealable lacquer.

The sealable polymer films, by contrast with the aluminum foils, may also be thermoformed. For instance, when polymer films are used, it is possible to use these to produce shaped lids which are likewise "sealed" onto the vessel to be closed, but which, after the pack has been opened, are suitable for closing it again after removal of a portion of the contents, for further storage.

According to the type of polymer from which the vessel to be sealed has been produced, corresponding sealing lacquers are used. For example, a sealing lacquer layer based on an acrylate resin with added additives for regulation of bond strength and melting point is applied to sealable films of rigid PVC.

When heat-sealable polymer films are used, it has been found that these have a significantly narrower processing range compared to aluminum foils. If sealing temperature and sealing time are too low, the polymer film does not permit sufficient heat transfer, and the film does not stick. If sealing temperature and sealing time are set too high, the polymer film will melt and flow away at the pressure needed for sealing. It will then become so thin in the sealing region that it breaks even under low stress, and faultless opening and reclosing of the pack is no longer possible.

There is usually only a small range of 10 to 20° C. between these two limiting conditions of sealing for the sealable polymer films. This should be strictly observed in order to ensure undisrupted production and faultless use of the sealed pack. Practical experience has shown that this is possible in a number of cases. Especially in the case of filling plants where multiple cups are being sealed simultaneously, sufficiently reliable temperature control is not always assured since differences in temperature of more than 20° C. between the different cavities are not unusual.

Sealable films of PVC have some disadvantages. Since they have to be provided with a sealing lacquer, they are comparatively costly. Moreover, the residual solvents originating from the sealing layer can be removed from the plastic only with a considerable degree of difficulty. An additional factor is that, for reasons of environmental protection, there is an increasing tendency to replace PVC for disposable packaging with other thermoplastics in some countries.

Attempts have thus been made for several years to produce heat-sealable films from polystyrene. The main reason why this has not been possible is that it has not been possible with the known adhesives to maintain sealing conditions that do not damage the polystyrene film. It is always necessary to heat the polystyrene film in the sealing region to such a degree that it softens there and flows away under the pressure needed for sealing. It then becomes so thin in the sealing region that it tears even under low stress and faultless opening of the pack is no longer possible.

DE 32 48 746 describes molding compounds for use as transparent packaging means based on polystyrene resins, block copolymers and lubricants.

DE-A-35 31 036 describes two-layer heat-sealable polymer films formed from a sealable layer composed of a mixture of 20 to 80 wt % of impact-resistant polystyrene, 5 to 70 wt % of a vinylaromatic-diene block copolymer and 8 to 30 wt % of a lubricant, and also a carrier layer formed, for example, from styrene-butadiene block copolymers.

EP-B 0406681 describes at least two-layer heat-sealable polymer films comprising 1 to 50 wt % of a heat-sealable layer A containing 20 to 80 wt % of an impact-resistant polystyrene A1, 5 to 70 wt % of a vinylaromatic-diene block copolymer A2, and 8 to 30 wt % of a lubricant A3; 0 to 95 wt % of a carrier layer B containing thermoplastically processible substances based on styrene and butadiene (e.g. HIPS); and 1 to 99 wt % of a polymer layer C other than B that melts above 200° C. (examples: nylon-6,6).

In all examples, a layer D is additionally used as adhesion promoter for A and C. Block copolymer A2 contains a diene homopolymer block; by way of example, elastomeric styrene-butadiene triblock copolymers (butadiene content 72 wt %) are used. The aforementioned heat-sealable polymer films have the disadvantage that they can result in impairment of taste in packaging of taste-sensitive foods.

It is an object of the present invention to develop heat-sealable films based on styrene polymer(s) having improved organoleptic properties, the sealing layer of which is additionally free of solvents. In addition, the film should be producible by coextrusion.

Furthermore, such films shall meet the requirement, for example, that they enable faultless production even in filling plants where filled cups are being sealed simultaneously in multiple cavities. This means—since the temperature range for processing cannot be extended downward owing to the low thermal conductivity of the polymer films—that it is necessary even in the case of higher sealing temperatures still to ensure, by means of suitable measures, faultless sealing and also problem-free performance of the sealed pack in use.

It has now been found that, surprisingly, organoleptic properties can be improved by the use of a heat-sealable polymer layer with a specific morphology.

The invention provides a heat-sealable multilayer film comprising:
a) 1 to 50 wt % of a heat-sealable polymer layer (A),
c) 1 to 99 wt % of a polymer layer (C), and
b) 0 to 95 wt % of a polymer layer (B),
where, if present, polymer layer (B) is between polymer layer (A) and polymer layer (C), and the proportions a), b) and c) are each based on the total weight of the film, and where
polymer layer (A) contains (or consists of):
  A1) 20 to 90 wt %—based on total weight of (A)—of at least one impact-resistant polystyrene (A1),
  A2) 5 to 50 wt %—based on total weight of (A)—of at least one vinylaromatic-diene (especially styrene-butadiene) block copolymer (A2); and
  A3) 0 to 30 wt %—based on total weight of (A)—of at least one glidant and/or lubricant (A3), and
  A4) 0 to 10 wt %—based on total weight of (A)—of additives and auxiliaries (A4) other than A3);
and where polymer layer (B) is different than (A) and (C) and contains at least one component (B1), selected from the group consisting of: impact-resistant polystyrene, vinylaromatic-diene (especially styrene-butadiene) block copolymers, and mixtures of styrene homopolymers or vinylaromatic-diene (especially styrene-butadiene) graft copolymers with vinylaromatic-diene (especially styrene-butadiene) block copolymers; and where
polymer layer (C) is different than (A) and (B) and has a melting temperature of at least 170° C.; and where
polymer layer (A) comprises
   (i) 66 to 99 vol % of a hard phase containing structural units of at least one vinylaromatic monomer, especially styrene, and
   (ii) 1 to 34 vol % of a soft phase containing structural units of at least one conjugated diene, especially butadiene;
and where the soft phase ii) is in the form of spheres and/or cylinders surrounded by the hard phase.

The proportion by volume of the two phases can be determined by high-resolution electron microscopy or solid-phase NMR spectroscopy.

The hard phase (i) of the polymer layer (A) is understood to mean the entire hard phase formed from components (A1) and (A2).

The hard phase (i) generally contains 85 to 100 wt %, preferably 90 to 100 wt %, of structural units of at least one vinylaromatic, especially styrene, and optionally 0 to 15 wt %, preferably 0 to 10 wt %, of structural units of at least one vinylaromatic monomer, especially styrene.

The soft phase (ii) of the polymer layer (A) is understood to mean the entire soft phase formed from components (A1) and (A2).

The soft phase (ii) generally contains at least 30 wt %, preferably at least 50 wt %, of structural units of at least one conjugated diene, especially butadiene, and optionally up to 70 wt %, preferably up to 50 wt %, of structural units of at least one vinylaromatic monomer, especially styrene.

The soft phase is preferably formed from diene and vinylaromatic structural units, especially styrene. The soft phase often contains 30 to 70 wt % of structural units of at least one conjugated diene, especially butadiene, and 30 to 70 wt % of structural units of at least one vinylaromatic monomer, especially styrene.

"Butadiene" means 1,3-butadiene.

The sum total of components A1) and A2), and, if present, A3) and/or A4) is 100 wt %.

The aforementioned polymer layer (A) preferably comprises
   i) 86 to 99 vol % of a hard phase, based on (A), containing structural units of at least one vinylaromatic monomer, especially styrene, and
   ii) 1 to 14 vol % of a soft phase, based on (A), containing structural units of at least one conjugated diene, especially butadiene.

Preference is given to heat-sealable multilayer films in which polymer layer (B) is present.

Preferred multilayer films of the invention comprise:
   (a) 3 to 30 wt % of polymer layer (A),
   (b) 50 to 90 wt % of polymer layer (B), and
   (c) 1 to 30 wt % of polymer layer (C).

Particularly preferred multilayer films of the invention comprise:
   (a) 3 to 15 wt % of polymer layer (A),
   (b) 60 to 90 wt % of polymer layer (B), and
   (c) 5 to 15 wt % of polymer layer (C).

The polymer film may additionally comprise (d) up to 10 wt %, preferably 1 to 10 wt %, based on the total weight of the film, of a further polymer layer (D)—other than (A) to (C).

The sum total of (a) and (c), and, if present, (b) and/or (d) is 100 wt %.

Polymer layer (D), if present, is between (A) and (C) or (B) and (C).

Polymer Layer (A)

Polymer layer (A) of the multilayer film of the invention has the particular property of being heat-sealable. It is therefore of good suitability for bonding to a carrier film.

According to the invention, the soft phase ii)—containing structural units of at least one conjugated diene—of the polymer layer (A) is in the form of spheres and/or cylinders dispersed in the hard phase i)—containing structural units of at least one vinylaromatic monomer. According to the invention, the dominant morphology of the soft phase ii) is not lamellar. The morphology is spherical and/or cylindrical; also in accordance with the invention is a mixed morphology of cylinders and/or spheres and lamellas, in which case the proportion of lamellas is less than 50% by volume—based on the total volume of cylinders/spheres and lamellas. According to the invention, the soft phase ii) is discontinuous and has segments containing diene structural units (proportion of diene structural units: at least 30 wt %, preferably at least 50 wt %) of spherical and/or cylindrical morphology.

The soft phase ii) is preferably in the form of spheres and/or cylinders and optionally—with a proportion of less than 50 vol %—lamellas each having an average diameter of 20 to 200 nm, preferably 25 to 150 nm, especially 30 to 100 nm. The aforementioned average diameter is determined by counting from a contrasted electron micrograph.

What has now been found, surprisingly, is that the heat-sealable polymer layer A used for the multilayer film of the invention—with a composition, soft phase and morphology as described above—has improved organoleptic properties.

Polymer layer (A) generally contains (or consists of):
   A1) 20 to 90 wt %—based on (A)—of at least one impact-resistant polystyrene (A1),
   A2) 5 to 50 wt %—based on (A)—of at least one vinylaromatic-diene (especially styrene-butadiene) block copolymer (A2); and
   A3) 0 to 30 wt %—based on (A)—of at least one glidant or lubricant (A3), and
   A4) 0 to 10 wt %—based on (A)—of additives and/or auxiliaries (A4), especially stabilizers for example.

Polymer layer (A) preferably contains (or consists of):
   A1) 40 to 90 wt %—based on (A)—of at least one impact-resistant polystyrene (A1),
   A2) 10 to 40 wt %—based on (A)—of at least one vinylaromatic-diene (especially styrene-butadiene) block copolymer (A2); and
   A3) 0 to 20 wt %—based on (A)—of at least one glidant or lubricant (A3), and
   A4) 0 to 5 wt %—based on (A)—of additives and/or auxiliaries (A4), especially stabilizers for example.

Polymer layer (A) more preferably contains (or consists of):
   A1) 65 to 85 wt %—based on (A)—of at least one impact-resistant polystyrene (A1),
   A2) 15 to 35 wt %—based on (A)—of at least one vinylaromatic-diene (especially styrene-butadiene) block copolymer (A2); and
   A3) 0 to 15 wt %—based on (A)—of at least one glidant or lubricant (A3), and
   A4) 0 to 2 wt %, preferably 0.01 to 2 wt %,—based on (A)—of additives and/or auxiliaries (A4), especially stabilizers for example.

Polymer layer (A) most preferably contains (or consists of):

A1) 65 to 75 wt %—based on (A)—of at least one impact-resistant polystyrene (A1), A2) 25 to 35 wt %—based on (A)—of at least one vinylaromatic-diene (especially styrene-butadiene) block copolymer (A2); and A3) 0 to 15 wt %—based on (A)—of at least one glidant or lubricant (A3), and A4) 0 to 2 wt %, preferably 0.01 to 2 wt %,—based on (A)—of additives and/or auxiliaries (A4), especially stabilizers for example.

Component (A1)

Component A1 is impact-resistant polystyrene ("HIPS=High Impact Polystyrene"). This is understood to mean a biphasic polystyrene formed from a hard matrix (hard phase) and a soft phase.

Also covered by the definition of component A1 is a mixture of impact-resistant polystyrene ("HIPS") and non-impact-modified polystyrene ("GPPS=General Purpose Polystyrene"). If component A1 used is the aforementioned mixture, the proportion of impact-resistant polystyrene is preferably more than 50 wt %, especially more than 70 wt %.

Component A1 used is preferably impact-resistant polystyrene alone.

The hard matrix (hard phase) of component A1 consists of one or more styrene polymers. The proportion of the hard matrix, based on component A1, is 60 to 95 wt %, preferably 80 to 95 wt %. A useful monomer for forming the hard matrix is especially styrene. However, it is also possible to use α-methylstyrene or p-methylstyrene or mixtures of substituted styrenes, but preference is given to the exclusive use of styrene, and so the hard matrix preferably consists of polystyrene.

The hard matrix of component A1 is formed in a manner known per se in the production of component A1 in that a soft phase, i.e. at least one rubber, e.g. a polydiene and/or at least one linear or star-shaped elastomeric vinylaromatic/diene block copolymer, especially linear vinylaromatic/diene diblock copolymer, is thermally or free-radically polymerized together with the styrene monomer that later forms the hard matrix. This forms graft copolymers of the rubber (soft phase) and ungrafted styrene polymers, the hard matrix.

The hard matrix may have a viscosity number ηsp/c in the range from 50 to 140, especially in the range from 70 to 120. This corresponds to average molar masses (Mw) in the range from 100 000 to 350 000 g/mol, especially 150 000 to 300 000 g/mol.

The soft phase of component A1 is finely dispersed in the hard matrix of component A1. The manner in which a soft phase can be dispersed in a hard matrix is known. The soft phase of component A1 is present in the hard matrix of component A1 in a proportion of 5 to 40 vol %, preferably of 5 to 20 vol %, especially 5 to 14 vol %. It has an average particle size in the range from 0.3 to 10 μm, preferably in the range from 0.5 to 8 μm. The particle size range mentioned is the average particle size, determined by counting from an electron micrograph, i.e. a number average.

The soft phase is thus a graft copolymer of the monomer(s) of the hard matrix, i.e. of styrene in particular, onto at least one rubber and/or at least one elastomeric linear or star-shaped vinylaromatic/diene copolymer, for example polybutadiene, and/or an elastomeric linear or star-shaped styrene-butadiene copolymer.

A preferred soft phase is polybutadiene and the graft copolymer thereof with styrene. Particularly suitable examples are polybutadienes and elastomeric styrene-butadiene block copolymers of the medium- or high-cis type with molecular weights in the range from 50 000 to 450 000 (weight average). Preference is given to using medium-cis polybutadienes having molar masses of 100 000 to 400 000.

Likewise of good suitability as soft phase is an elastomeric linear or star-shaped vinylaromatic/diene block copolymer or the graft copolymer thereof with styrene. The elastomeric vinylaromatic/diene block copolymer may be a di-, tri- or multiblock copolymer, preferably a linear diblock copolymer.

Elastomeric linear or star-shaped block copolymers are obtained by anionic polymerization with the aid of lithium initiators. Useful vinylaromatic monomers for formation of the first block include styrene and substituted styrenes. These include styrene, which is preferably used on its own, o-, m- and p-methylstyrene. The second block of the block copolymer is preferably formed solely from butadiene.

Preference is given to using elastomeric diblock copolymers. Such a diblock copolymer may have, for example, a block polystyrene content of 40 to 90 wt %, based on the block copolymer (the remainder in each case being butadiene). The block copolymer mentioned is one having what is called a sharp transition. It is known, for example, from A. Echte, Angew. Makr. Chemie 58/59 175 (1977), how such block copolymers can be obtained. The block copolymer is to have an average molecular weight (Mw) of 100 000 to 300 000, preferably of 150 000 to 250 000.

If mixtures of polydienes and elastomeric linear or star-shaped block copolymers are used as rubber, the total polydiene content is calculated from the proportion, for example, of the polybutadiene and, for example, from the butadiene content present in the block copolymer, especially diblock copolymer. This total polydiene content, based on component A1, should be in the range from 2 to 30 wt %, preferably 4 to 15 wt %.

The following is a practical example: a mixture of 8 wt % of styrene-butadiene diblock copolymer having a butadiene content of 50 wt % and 6 wt % of homopolybutadiene are employed. The total polybutadiene content in that case is 8×0.5=4 wt % of polybutadiene from the diblock copolymer and 6 wt % from the homopolymer of butadiene, and so the total polybutadiene content is 10 wt %.

Particular preference is given to impact-resistant polystyrene resins that are produced by the methods described in DE-A-17 70 392, or those that have particularly good stress-cracking resistance (cf. DE-A-25 25 019). It is also possible to use impact-resistant polystyrene having translucent properties, as described, for example, in DE-A-26 13 352.

Component (A2)

Vinylaromatic-diene block copolymer A2 (=component (A2)) is formed from at least one block S—which forms a hard phase—containing (or consisting of) structural units of at least one vinylaromatic monomer, especially from the group of styrene, α-methylstyrene, ring-alkylated styrene such as p-methylstyrene or mixtures thereof, most preferably styrene, and at least one block B and/or block B/S, preferably block B/S—which forms a soft phase—containing structural units of a conjugated diene, especially of butadiene and/or isoprene, preferably butadiene. Block B/S also contains structural units of at least one vinylaromatic monomer—as mentioned above—especially styrene.

Block B/S is preferably constructed randomly.

Block copolymer A2 preferably does not contain any block B, but rather contains one or more, preferably randomly constructed, block(s) B/S consisting of structural units of a conjugated diene, especially butadiene, and structural units of at least one vinylaromatic comonomer, especially styrene.

The block copolymer may consist of 2, 3 or more blocks; it may be linear or star-shaped.

Block copolymer A2 preferably contains at least 2 terminal blocks S. More preferably, the block copolymer A2 is a triblock copolymer containing 2 terminal blocks S, especially a triblock copolymer containing 2 terminal blocks S and one or more, preferably randomly constructed, block(s) B/S in between. More preferably, block copolymer A2 is a linear triblock copolymer of the structure S-B/S-S, where the block B/S is formed, preferably randomly, from structural units of a conjugated diene, especially butadiene, and structural units of at least one vinylaromatic comonomer, especially styrene.

The vinylaromatic-diene block copolymer (A2) is preferably a block copolymer containing structural units of styrene and butadiene.

The proportion of diene structural units, especially butadiene structural units—based on the vinylaromatic-diene block copolymer (A2)—is often 25 to 50 wt %, often preferably 30 to 40 wt %. Correspondingly, the proportion of vinylaromatic structural units, especially styrene structural units—based on the vinylaromatic-diene block copolymer (A2)—is often 50 to 75 wt %, often preferably 60 to 70 wt %.

The soft phase of component A2 is finely dispersed in the hard matrix of component A2.

The proportion of soft phase, based on block copolymer A2, is often 60 to 95 vol %, often preferably 60 to 80 vol %, often more preferably 65 to 75 vol %. Accordingly, the proportion of the hard phase, based on block copolymer A2, is often 5 to 40 vol %, often preferably 20 to 40 vol %, often more preferably 25 to 35 vol %.

The at least one, preferably randomly constructed, copolymer block (B/S), often consists of 30 to 70 wt %, often preferably 30 to 50 wt %, of vinylaromatic monomers, especially styrene, and 30 to 70 wt %, often preferably 50 to 70 wt %, of diene, especially 1,3-butadiene.

The at least one block S preferably has a number-average molecular weight Mn in the range from 10 000 to 50 000 g/mol.

The at least one block B or B/S, preferably B/S, preferably has a number-average molecular weight Mn in the range from 30 000 to 200 000 g/mol.

The aforementioned block copolymers A2) are typically obtained by anionic polymerization, especially an anionic solution polymerization method with an alkyllithium compound as initiator. The preparation of linear and star-shaped block copolymers by anionic solution polymerization is known (see, for example, WO 95/353335 A1, page 5 line 38 to page 6 line 47).

The random soft blocks B/S are prepared in the presence of a randomizer. Suitable randomizers are donor solvents, such as ethers, e.g. tetrahydrofuran, or tertiary amines, or preferably soluble potassium salts, for example potassium alkoxides, especially a potassium alkoxide of a tertiary alcohol having at least 5 carbon atoms.

Suitable styrene-butadiene copolymers (A2) are commercially available as Styroflex® 2G 66 from Ineos Styrolution (Frankfurt, Germany).

Component A3)

Lubricants and/or glidants (A3) (=component A3) that can be used in principle are any low molecular weight substances that are compatible in the required amount with components A1, A2 and optionally A4 in the molding compound. These include, for example, mineral oils, aromatic or aliphatic alcohols or esters, such as dodecyl alcohol, butyl stearate, diethylhexyl phthalate etc.

These may also include ethylene oxide-propylene oxide block copolymers; microscale hard waxes; ethylenebisstearylamide (Acrawax); metal soaps, especially of the alkaline earths and of zinc; mineral oils based on naphthenic and paraffinic hydrocarbons in particular (especially the technical grade and medical white oils); silicone oils having viscosities in the range from 0.5 to 50 000 mPas.

Component A4)

Component A4) may be at least one additive and/or auxiliary (A4)—other than A3). Components A4) used are often stabilizers, demolding agents, antistats, antioxidants, pigments and/or fillers.

Preference is given to using stabilizers.

Polymer Layer (B)

The polymer layer (B) used if required in the sealable multilayer film of the invention should be referred to as the carrier or carrier film of the heat-sealable multilayer film. Polymer layer (B) is different than polymer layers (A) and (C) and contains at least one component (B1) selected from the group consisting of: impact-resistant polystyrene, vinylaromatic-diene (especially styrene-butadiene) block copolymers, and mixtures of styrene homopolymers or vinylaromatic-diene (especially styrene-butadiene) graft copolymers with vinylaromatic-diene (especially styrene-butadiene) block copolymers. The heat-sealable polymer layer (A) adheres to the aforementioned materials even without adhesive or adhesion promoter.

A preferred component (B1) is impact-resistant polystyrene formed from a hard matrix (hard phase) and an elastomeric soft phase. The impact-resistant polystyrene is especially a high-impact polystyrene resin.

In this case, the hard matrix is formed from the polymer of a monovinylaromatic monomer. The proportion of the hard matrix, based on component B1, is 60 to 95 wt %, preferably 70 to 90 wt %. The monovinylaromatic monomer used is especially styrene, but substituted styrenes or copolymers of styrene with other suitable monomers such as maleic anhydride or methyl methacrylate are also usable as hard matrix.

The corresponding soft phase of component (B1) is finely dispersed in the resin matrix in the customary manner and is present in the hard matrix in a proportion of 5 to 40 wt %, preferably 8 to 20 wt %, based on (B1).

The soft phase of component (B1) has, for example, an average particle size in the range from 0.3 to 10 μm.

The soft phase is a graft copolymer of the monomer(s) of the hard matrix, i.e. especially of styrene, onto at least one rubber and/or at least one elastomeric linear or star-shaped vinylaromatic/diene block copolymer, for example polybutadiene and/or an elastomeric linear or star-shaped styrene-butadiene block copolymer.

The elastomeric linear or star-shaped vinylaromatic/diene block copolymer may be a di-, tri- or multiblock copolymer, preferably a linear diblock copolymer of the A-B type.

The soft phase is preferably, for example, polybutadiene or the graft copolymer thereof with preferably styrene.

Suitable graft bases are generally polymers having 4 to 5 carbon atoms; especially suitable is polybutadiene of the medium- or high-cis type with a molecular weight (weight average) in the range from 50 000 to 450 000 g/mol. Preference is given to using medium-cis polybutadiene having a molar mass of 100 000 to 400 000 g/mol.

The soft phase use may also be vinylaromatic-diene block copolymers, especially styrene-butadiene copolymers. These may be used alone or in addition to the graft copolymers.

Examples are diblock copolymers A-B formed from a styrene block A and a polybutadiene B. The diblock copolymer may have, for example, a block styrene content of 30 to 90 wt %, the remainder being butadiene.

If a mixture of polydiene and elastomeric linear or star-shaped block copolymer is used, the polydiene is considered to be the total amount of, for example, polybutadiene and, for example, the butadiene content in the block copolymer. The total amount of polydiene, based on component B1, should be in the range from 4 to 40 wt %, preferably 4 to 20 wt %.

Component (B1) is more preferably impact-resistant polystyrene that has been prepared by the process described in DE-B 17 70 392.

Polymer layer (B) may also contain 0 to 8 wt %—based on (B)—of one or more customary additives and/or auxiliaries (B2)—as described above for component (A3) and/or (A4).

Preferably, polymer layer (B) does not contain any additive and/or auxiliary according to component (A3) as component (B2).

Polymer Layer (C)

Polymer layer (C) is different than polymer layers (A) and (B) and has a melting temperature of at least 170° C.

Polymer layer (C) is to be high-melting and is to prevent the heat-sealing film (polymer layer (A)) from sticking on the sealing head.

However, polymer layer (C) of the multilayer film not only replaces a protective lacquer but also increases the processing range of the sealable multilayer film to such a degree that the carrier layer is prevented from flowing away even in the case of very high sealing temperatures and sealing times, and hence faultless processing and problem-free application of the heat-sealing film is first enabled.

Suitable materials for polymer layer (C) of the heat-sealable multilayer films of the invention are thermoplastic polymers (component C1) having a melting temperature ($T_m$) of at least 170° C., preferably at least 200° C. Thus, suitable components (C1) are, for example, the polymers listed below by way of example:
- nylon-6 (=polycaprolactam, $T_m$: 220° C.)
- nylon-6,6 (=polyhexamethyleneadipamide, $T_m$: 255° C.)
- polyamide copolymerized with butylene terephthalate (basis: hexamethylenediamine, caprolactam, terephthalic acid, $T_m$: 298° C.)
- polybutylene terephthalate (=condensate of terephthalic acid or dimethylphthalic acid and butane-1,4-diol, $T_m$: 220 to 225° C.).

Also suitable are: polyphenylene oxide (with a softening temperature of at least 170° C.) and mixtures thereof with polystyrene, polysulfones, polyether sulfones, polyether ketones, LC polymers, polyetherimides, crystalline polyethylene terephthalate, polyphenylene sulfide, polyamide-imide copolymers or polyamides of the structure of nylon-6,12, nylon-11, nylon-4,6 etc., provided that the melting temperature or softening range is at least 170° C., preferably at least 200° C.

Polymer layer (C), as well as component (C1), may optionally contain 0 to 20 wt %—based on polymer layer (C)—of at least one component (C2)—other than (C1)—which is miscible with (C1). Suitable components (C2) are polymers miscible with the at least one polymer (C1). In addition, polymer layer (C) may contain one or more customary additives and/or auxiliaries (=component C3)—as described above for component (A4) and/or (A3).

Polymer Layer (D)

The multilayer film of the invention may additionally comprise a further polymer layer (D)—other than (A) to (C).

Polymer layer (D) is a functional layer, for example an adhesive or adhesion promoter (AP), a gas or water vapor barrier, an opaque or colored layer, a layer with an anti-electrostatic finish, with improved printability or improved scratch resistance, or with high impact resistance etc.

Depending on the nature of the polymer layers (B) and (C), for firm bonding of the individual polymer layers (A) and (C), or, if (B) is present, the individual polymer layers (A), (B) and (C), a preferably thermoplastic adhesive or adhesion promoter (AP) may be necessary.

Experience has shown that no APs are needed for the bonding of (A) to (B) when (B) is a polymer formed solely from styrene and butadiene with less than 15% of further comonomers.

Polymer layer (D) often contains copolymers with functional groups, for example copolymers containing structural units derived from maleic anhydride—e.g. ethylene-vinyl acetate-maleic anhydride copolymers and/or styrene-maleic anhydride copolymers—or copolymers containing structural units derived from glycidyl (meth)acrylate.

Polymer layer (A) or, if present, polymer layer (B) may advantageously be bonded with the aid of such copolymers containing functional groups to a polymer layer (C) based on polyamide or polyesters—for example polyethylene terephthalate, polybutylene terephthalate.

In a further embodiment, polymer layer (D) may contain styrene-butadiene or styrene-isoprene block copolymers, which are helpful, for example, in order to better mutually compatibilize different styrene polymer-containing layers, for example (A) and (B), and to reduce what is called the tendency to delamination.

Polymer layer (D) of the heat-sealable multilayer film of the invention may, for example, also be a further layer of a thermoplastic having high gastightness and/or tightness to water vapor that has been installed as a gas or water vapor barrier. This layer protects the contents, for example, from drying out or from being affected by oxygen. Examples are layers of ethylene-vinyl alcohol copolymers that have high gastightness or of thermoplastically processible PVDC copolymers with high gastightness and tightness to water vapor etc. Such a layer, if necessary, should likewise be bonded to the adjacent components by a suitable adhesion promoter.

Also possible as polymer layer (D) is a separate, largely opaque or otherwise colored layer that protects the contents, for instance, from the effect of light. For this purpose, suitable pigments, preferably carbon black or mixtures of carbon black with titanium dioxide or further pigments, are added to a material, for example as per components (B1) or (C1), and an additional layer endowed with pigments is inserted; this enables adhesion without APs.

Correspondingly, polymer layer (D) may, for example, be a layer with an anti-electrostatic finish, with improved printability or improved scratch resistance, or with high impact resistance etc.

Preferably, polymer layer (D) contains at least one component (D1) selected from: adhesion promoters, preferably thermoplastic adhesion promoters, especially based on copolymers containing structural units of maleic anhydride (e.g. ethylene-vinyl acetate-maleic anhydride copolymers, styrene-maleic anhydride copolymers), copolymers containing structural units of glycidyl (meth)acrylate, vinylaromatic-diene block copolymers, and gas barrier and/or water vapor barrier materials, preferably based on ethylene-vinyl alcohol copolymers and/or vinylidene chloride homo- or copolymers.

More preferably, polymer layer (D) contains, as component (D1), an adhesion promoter, preferably a thermoplastic adhesion promoter.

Most preferably, component (D1) is a thermoplastic adhesion promoter based on copolymers containing structural units of maleic anhydride, for example ethylene-vinyl acetate-maleic anhydride copolymers and/or styrene-maleic anhydride copolymers, or copolymers containing structural units of glycidyl (meth)acrylate.

Polymer layer (D) often consists of the at least one component (D1).

Production of Multilayer Film

The heat-sealable multilayer film of the invention is preferably produced by the coextrusion method. This method is known. Coextrusion can be effected at temperatures of 170° C. to 300° C. The components of the individual polymer layers (A) and (C), and optionally (B) and/or (D), are melted in different extruders (i.e. components of polymer layer (A) in extruder (I), components of polymer layer (B) in extruder (II) etc.), and are then combined, for example, with the aid of multiple manifold dies or annular dies. Alternatively, the layer(s) can be combined, for example, in an adapter.

In addition, it is also possible to apply one or more layers to the other extruded layer(s) by laminating.

In the extrusion, it is possible to adjust the thickness of the individual layers to the demands on the finished films, for example by varying extruder speeds.

It is advantageous that the high-melting polymer layer (C) can be applied in one operation in the production of the heat-sealable multilayer film by the method of coextrusion or by laminating. This avoids the applying of a protective varnish in a subsequent operation and also of solvents that are difficult to eliminate.

This achieves the effect that the heat-sealable multilayer films of the invention can be applied in virtually the same way and in the same filling plants as sealable aluminum foils without any need for laborious changes to the filling plants. This means that the main barriers to the breadth of use of such sealable polymer films are eliminated in practice.

Use of the Heat-Sealable Multilayer Film

The invention further provides for the use of the heat-sealable multilayer film as closure of vessels (or packs) based on styrene polymer(s).

The heat-sealable multilayer films obtained as described above are sealed in the customary sealing units used for heat-sealing onto vessels made of styrene polymers, for example of styrene homopolymers, styrene-butadiene graft copolymers or block copolymers, or mixtures of these materials. The vessels may also consist of other styrene polymers, for example those that contain a certain proportion of copolymers such acrylonitrile. Very frequently, multilayer films are used for vessels or packs. These too are suitable for closure with the heat-sealable multilayer films of the invention, provided that the inner layer onto which the lid is sealed consists of a styrene polymer which seals to the polymer layer (A) of the heat-sealable multilayer film.

The sealing conditions, for a defined shape of the sealing head, are described by the temperature of the sealing head, the pressure during the sealing operation and the sealing time. The sealing conditions are very highly dependent on the thickness of the sealable multilayer film. For example, in the case of a sealing temperature of 200° C. and a sealing pressure of 2 bar, a 0.1 mm-thick film may be sealed satisfactorily even within 0.2 to 0.3 sec, whereas a 0.25 mm-thick film takes 0.8 to 1 sec of sealing time under the same conditions.

Depending on the nature of polymer layer (C) of the heat-sealable multilayer film, suitable sealing conditions are pressures of 1 to 5 bar, sealing temperatures of 140° C. to 280° C. and sealing times of 0.1 to 2 sec.

The heat-sealable multilayer film of the invention has distinctly improved organoleptic properties and thus has the advantage that the taste of taste-sensitive foods is not impaired.

The invention therefore further provides for the use of the heat-sealable multilayer film as closure of vessels (or packs) based on styrene polymers that contain taste-sensitive foods.

The invention is elucidated by the examples and claims.

EXAMPLES

The coextrusion process produces a sealable multilayer film composed of polymer layers A (20 wt %), B (70 wt %) and C (10 wt %).

Sealable polymer layer A: mixture of 80 wt % of an impact-resistant polystyrene having a butadiene content of 8 wt % [Vicat B/50: 95° C.; melting index: 5 g/10 min determined to ISO 1133 (200° C./5 kg); average rubber particle size: 2 μm] and 20 wt % of a styrene-butadiene block copolymer having a butadiene content of 35 wt % (Styroflex® 2G66 from INEOS Styrolution).

Figure 1:
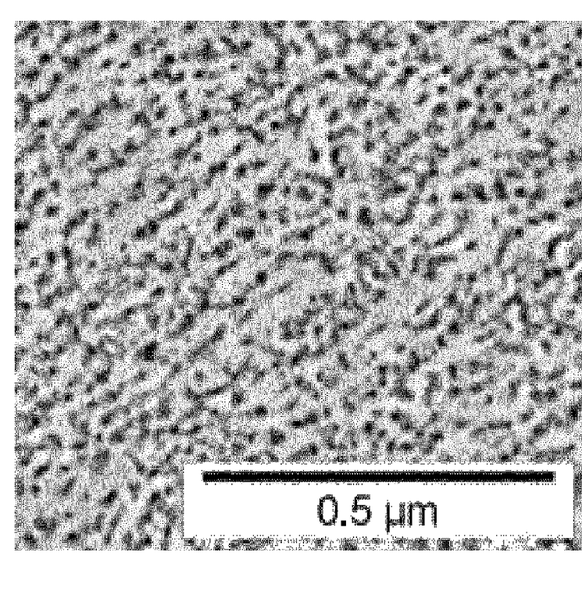

FIG. 1 shows an electron micrograph (OsO4 contrast, enlargement 1:50 000) of the polymer layer A according to example 1. What is clearly apparent is a discontinuous soft phase of butadiene-containing segments of cylindrical morphology, dispersed in polystyrene.

Polymer layer B: impact-resistant polystyrene with butadiene content 8 wt %, Vicat B/50 of 95° C., melting index: 5 g/10 min determined to ISO 1133 (200° C./5 kg) and an average rubber particle size of 2 μm.

Polymer layer C: nylon-6,6, melting point 260° C., determined to ISO 1218, method A.

Polymer layer B is fed to a multiple manifold die through a main extruder, and polymer layers A and C through one side extruder each. The processing temperatures of the molding compounds were:

polymer layer A: 189° C.; polymer layer B: 210° C.; polymer layer C: 280° C.

The layer structure of the film was as follows:

polymer layer A: 0.05 mm; polymer layer B: 0.2 mm; polymer layer C: 0.02 mm.

The heat-sealable polymer layer A produced, and optionally also the sealable multilayer film, were used to conduct organoleptic studies.

The organoleptic studies were conducted in a 100 ml Erlenmeyer flask that had been filled with 10 g of the multilayer film or 10 g of polymer layer A according to the examples. Boiling water was poured directly from the kettle into the Erlenmeyer flask.

The water vapor was taken directly by hand to the nose and assessed by a committee of at least 3 persons by the following criteria:

0=completely neutral; no odor at all
1=slight perception of odor
2=perceptible odor, but entirely acceptable
3=strong odor, still acceptable
4=very strong odor, unacceptable.

It is advantageously possible to use the multilayer films to produce vessels where the films have no adverse odor.

The invention claimed is:

1. A heat-sealable multilayer film comprising:
   a) 1 to 50 wt % of a heat-sealable polymer layer (A),
   b) 1 to 99 wt % of a polymer layer (C), and
   c) 0 to 95 wt % of a polymer layer (B),
   wherein, if present, the polymer layer (B) is between the heat-sealable polymer layer (A) and the polymer layer (C), and the proportions of a), b), and c) are each based on the total weight of the heat-sealable multilayer film;
   wherein the heat-sealable polymer layer (A) contains:
   A1) 20 to 90 wt %, based on the total weight of the heat-sealable polymer layer (A), of at least one impact-resistant polystyrene (A1);
   A2) 5 to 50 wt %, based on the total weight of the heat-sealable polymer layer (A), of at least one vinylaromatic-diene block copolymer (A2);
   A3) 0 to 30 wt %, based on the total weight of the heat-sealable polymer layer (A), of at least one glidant and/or lubricant (A3); and
   A4) 0 to 10 wt %, based on the total weight of the heat-sealable polymer layer (A), of auxiliaries and/or additives (A4) other than (A3);
   wherein the polymer layer (B) is different than the heat-sealable polymer layer (A) and the polymer layer (C);
   wherein the polymer layer (B) contains at least one component (B1) selected from the group consisting of: impact-resistant polystyrene, vinylaromatic-diene block copolymers, and mixtures of styrene homopolymers or vinylaromatic-diene graft copolymers with vinylaromatic-diene block copolymers;
   wherein the polymer layer (C) is different than the heat-sealable polymer layer (A) and the polymer layer (B);
   wherein the polymer layer (C) has a melting temperature of at least 170° C.;
   wherein the heat-sealable polymer layer (A) comprises:
   (i) 66 to 99 vol % of a hard phase, based on the total volume of the heat-sealable polymer layer (A), containing structural units of at least one vinylaromatic monomer; and
   (ii) 1 to 34 vol % of a soft phase, based on the total volume of the heat-sealable polymer layer (A), containing structural units of at least one conjugated diene; and
   wherein the soft phase (ii) is in the form of spheres and/or cylinders surrounded by the hard phase.

2. The heat-sealable multilayer film of claim 1, wherein the heat-sealable polymer layer (A) comprises:
   (i) 86 to 99 vol % of the hard phase containing structural units of the at least one vinylaromatic monomer; and
   (ii) 1 to 14 vol % of the soft phase containing structural units of the at least one conjugated diene.

3. The heat-sealable multilayer film of claim 1, wherein the soft phase (ii) is in the form of spheres and/or cylinders, and optionally, with a proportion of less than 50 vol %, of lamellas each having an average diameter of 20 to 200 nm.

4. The heat-sealable multilayer film of claim 1, wherein the heat-sealable polymer layer (A) is formed from:
   A1) 40 to 90 wt %, based on the total weight of the heat-sealable polymer layer (A), of the least one impact-resistant polystyrene (A1);
   A2) 10 to 40 wt %, based on the total weight of the heat-sealable polymer layer (A), of the least one vinylaromatic-diene block copolymer (A2);
   A3) 0 to 20 wt %, based on the total weight of the heat-sealable polymer layer (A), of the least one glidant and/or lubricant (A3); and
   A4) 0 to 5 wt %, based on the total weight of the heat-sealable polymer layer (A), of the additives and/or auxiliaries (A4).

5. The heat-sealable multilayer film of claim 1, wherein the vinylaromatic-diene block copolymer (A2) is formed from at least one block S, which forms a hard phase, containing structural units of at least one vinylaromatic monomer, and at least one block B and/or block B/S, which forms a soft phase, containing structural units of a conjugated diene and also, in the case of the B/S block, structural units of at least one vinylaromatic monomer.

6. The heat-sealable multilayer film of claim 5, wherein the vinylaromatic-diene block copolymer (A2) does not contain the B block and the B/S block is constructed randomly.

7. The heat-sealable multilayer film of claim 5, wherein the vinylaromatic-diene block copolymer (A2) contains at least two terminal blocks S and has a linear or star-shaped construction.

8. The heat-sealable multilayer film of claim 5, wherein the proportion of the soft phase of the vinylaromatic-diene block copolymer (A2) is 60 to 95 vol %, and the proportion of the hard phase of the vinylaromatic-diene block copolymer (A2) is 5 to 40 vol %.

9. The heat-sealable multilayer film of claim 5, wherein the copolymer block (B/S) of the vinylaromatic-diene block copolymer (A2) consists of 30 to 70 wt % of structural units of the at least one vinylaromatic monomer, and 30 to 70 wt % of structural units of the conjugated diene.

10. The heat-sealable multilayer film of claim 5, wherein the vinylaromatic-diene block copolymer (A2) includes 25 to 50 wt % of structural units of the conjugated diene, and 25 to 50 wt % of structural units of the at least one vinylaromatic monomer.

11. The heat-sealable multilayer film of claim 5, wherein the vinylaromatic-diene block copolymer (A2) is a styrene butadiene block copolymer.

12. The heat-sealable multilayer film of claim 1 comprising:
   a) 3 to 30 wt % of the heat-sealable polymer layer (A);
   b) 50 to 90 wt % of the polymer layer (B); and
   c) 1 to 30 wt % of the polymer layer (C).

13. The heat-sealable multilayer film of claim 1, further comprising 1 to 10 wt %, based on the total weight of the heat-sealable multilayer film, of a further polymer layer (D), other than the heat-sealable polymer layer (A), the polymer layer (B), and the polymer layer (C), which is between the heat-sealable polymer layer (A) and the polymer layer (C), or the polymer layer (B) and the polymer layer (C).

14. The heat-sealable multilayer film of claim 13, wherein the polymer layer (D) contains at least one component (D1) selected from the group consisting of adhesion promoters, copolymers containing structural units of glycidyl (meth) acrylate, vinylaromatic-diene block copolymers, and gas barrier and/or water vapor barrier materials.

15. A process for producing a heat-sealable multilayer film of claim 13, comprising the steps of:

i) melting the components used for the heat-sealable polymer layer (A) in an extruder (I), melting the components used for the polymer layer (C) in an extruder (II), if present, melting the components used for the polymer layer (B) in an extruder (III), and, if present, melting the components used for polymer layer (D) in an extruder (IV); and ii-1) producing a multilayer film by coextruding the heat-sealable polymer layer (A), the polymer layer (C), and optionally the polymer layer (B) and/or the polymer layer (D); or ii-2) producing a multilayer film by extruding individually the heat-sealable polymer layer (A), the polymer layer (C), optionally the polymer layer (B) and optionally the polymer layer (D), and then laminating the polymer layers to one another.

16. The heat-sealable multilayer film of claim 1, wherein the polymer layer (C) contains at least one thermoplastic polymer (C1) selected from the group consisting of polyesters, polyamides, and polyesteramides.

17. The heat-sealable multilayer film of claim 1, wherein the at least one component (B1) of the polymer layer (B) is impact-resistant polystyrene.

18. A method of closing vessels based on styrene polymers comprising the heat-sealable multilayer film of claim 1.

19. The method of claim 18, wherein the vessels are vessels containing taste-sensitive foods.

20. The heat-sealable multilayer film of claim 1, wherein the heat-sealable polymer layer (A) comprises:
 (i) 66 to 99 vol %, based on the total volume of the heat-sealable polymer layer (A), of structural units of styrene in the hard phase; and
 (ii) 1 to 34 vol %, based on the total volume of the heat-sealable polymer layer (A), of structural units of butadiene in the soft phase.

* * * * *